(No Model.) 2 Sheets—Sheet 1.

T. S. WOODRUFF.
DEVICE FOR ATTACHING FENCE WIRES TO POSTS.

No. 244,411. Patented July 19, 1881.

Witnesses
W. R. Edelen.
A. Kendall

Inventor.
T. S. Woodruff
Per Hallock & Hallock
Att'ys.

(No Model.) 2 Sheets—Sheet 2.
T. S. WOODRUFF.
DEVICE FOR ATTACHING FENCE WIRES TO POSTS.
No. 244,411. Patented July 19, 1881.
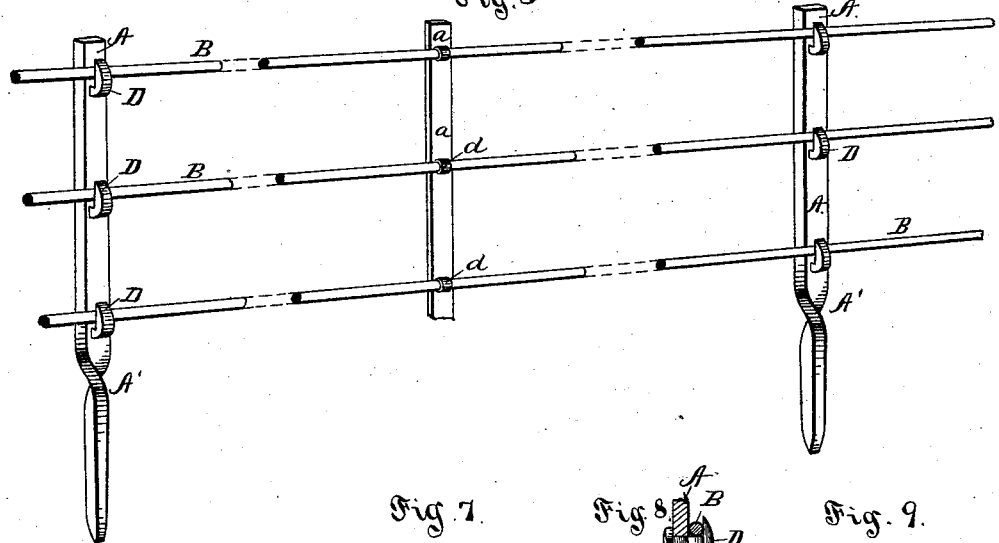
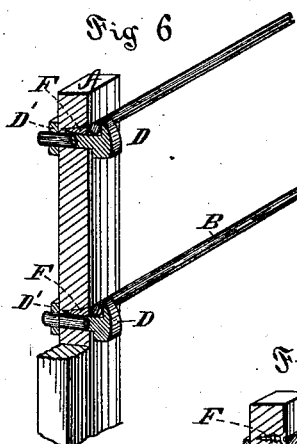
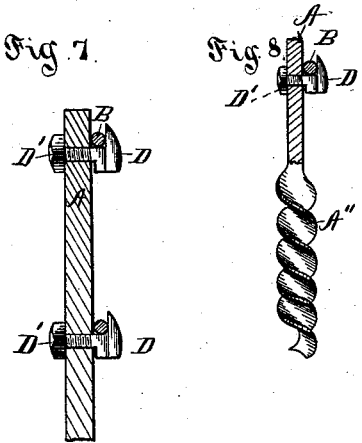
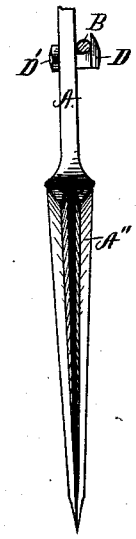
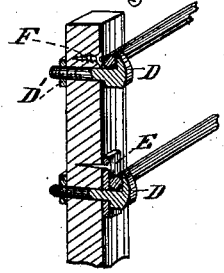
Witnesses
W. R. Edelen
A. Kendall
Inventor
T. S. Woodruff
Per Hallock & Hallock
Att'ys
N. PETERS, Photo-Lithographer, Washington, D. C.

UNITED STATES PATENT OFFICE.

THOMAS S. WOODRUFF, OF ERIE, PENNSYLVANIA.

DEVICE FOR ATTACHING FENCE-WIRES TO POSTS.

SPECIFICATION forming part of Letters Patent No. 244,411, dated July 19, 1881.

Application filed May 16, 1881. (No model.)

*To all whom it may concern:*

Be it known that I, THOMAS S. WOODRUFF, a citizen of the United States, and a resident of Erie, Erie county, Pennsylvania, have invented new and useful Improvements in Devices for Attaching the Wires of Wire Fences to the Posts; and I do hereby declare that the following is a full, clear, and exact description thereof, reference being had to the accompanying drawings, and the letters or figures of reference marked thereon.

My invention relates to improvements in the construction of wire fences, such as barbed-wire fences, &c.

The object, purpose, and scope of my invention will appear in the following general description and claim.

Figure 1:
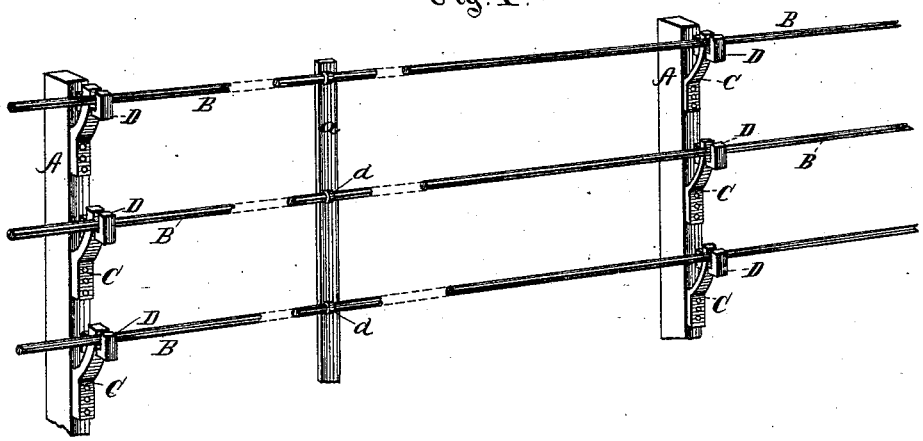
Figure 2:
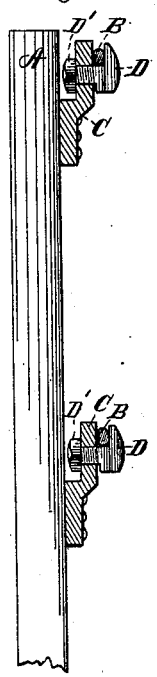
Figure 4:
Figure 3:
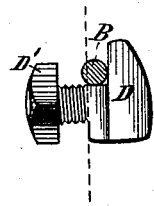

My device is illustrated in the accompanying drawings, as follows:

Figures 1 and 5 are perspective views of a line of fence constructed in accordance with my invention. In Fig. 1 the posts are of wood, and in Fig. 5 they are of iron. Fig. 2 is a side view of one of the posts shown in Fig. 1, with the fastening device shown in vertical section. Fig. 3 is a view of the fastening-bolt and nut. Fig. 4 is a vertical section of the stay-piece *a* shown in Figs. 1 and 5, and shows the attaching-staple *d*. Figs. 6, 7, and 10 are views showing the fastening-bolt in Fig. 3 in use on a wooden post without the bracket-irons C shown in Fig. 1. Figs. 8 and 9 show analogous methods of constructing the ground part of iron posts, such as is shown in Fig. 5. Fig. 11 is a view of a facing-plate, shown at E in Fig. 10.

The letters of reference indicate parts as follows: A, the posts, whether of iron or wood; B, the wires; C, the iron brackets, which are attached to the wooden posts, and to which the wires are attached by the attaching-bolt. D is the attaching-bolt, and D' the nut thereon. *a* is a stay-piece for holding the wires at points between the posts, and is for the purpose of permitting the main posts being at greater distance apart. It may rest upon or be driven into the ground. It has openings, through which staples *d* pass and are clinched. A' A'' A''' are different forms which may be given to the ground part of iron posts, one of which, A', is a single half-twist in the flat bar of iron forming the post, and is for the purpose of giving greater strength to the post at or near the surface of the ground. A'' is in the form of an auger-bit, for the purpose of both giving strength and also for entering the post into the ground by screwing it in. A''' is a winged spike.

The essential feature of my device is the wire-fastening bolt D.

The wires of wire fences are fastened usually by means of staples driven into the posts. The objection to this mode of fastening is that if it alone is relied upon throughout the fence it is inadequate. A fence so constructed needs constant attention to keep the wires in place. Animals run against the wires and pull out the staples. The wires cannot be kept taut.

To keep animals from running against the wires it has, in many places, become common to attach to the upper wire a thin narrow strip of lumber, letting it hang thereon by wire loops or strings, which strips serve to make the fence more noticeable, and thus attract the attention of the fast-running animal in time to turn and not run blindly upon the wires. These strips, while performing the function for which they were intended, catch a great deal of wind, and thus exert so much force upon the wires as to draw the staples from the posts.

Staples may be used to advantage on some of the posts; but to properly hold the wires a stronger fastening must be provided on posts placed at certain intervals. The bolt D, which I provide, is adapted to serve this purpose fully. It is formed with an L-shaped head, similar to a railroad-rail spike, and has a screw-threaded shank, on which the nut D' screws. This bolt may be of sufficient length to pass through a wooden post, as is shown in Figs. 6, 7, and 10; or it may be short, and iron brackets be used, through which it passes, as shown in Figs. 1 and 2. When iron posts are used, as in Figs. 5, 8, and 9, the bolt passes through them, and, as they are thin, the bolt is proportionally short. It will be seen by reference to the drawings that the wire is held between the L-shaped head of the bolt D and the face of the post, as in a vise, when the nut D' is screwed up. It is therefore desirable that the face of the post be provided with an iron bearing. Where brackets C are used, as in Figs. 1 and 2, which brackets are made of strap-iron, the iron bearing is fully provided; but such a construction, while it is very strong and admits of the bolts being very short, is still quite expensive. A broad-headed nail or screw, F, as shown in Figs. 6 and 10, will afford a bearing which will be very cheap. A small iron plate, with an opening through it for the bolt, (see E in Figs. 10 and 11,) will be found to be a very effective and reasonably cheap form of bearing. This plate E may be a common washer, of proper size, fitting loosely upon the bolt. If, however, the wood of the post is sufficiently hard, the bolt may be used without an iron or metallic bearing on its face, as is shown in Fig. 7.

By the use of my bolt D the wires can be griped so firmly that they will not draw through the fastening when run upon by an animal, which, when staples are used, is often the case, and results in bringing the slack of the two adjoining sections into the one where the pressure was exerted, thereby causing the wires in that section, or some of them, to sag so much as to make the fence at that point too low. Another advantage arising from my device is that by the use of a wrench the wires can at any time be loosened from their fastening and drawn perfectly taut, if for any reason they have become sagged. Another advantage is that if the wire be broken in any section it can be loosened and spliced, and also that a splice can be made by pinching the two ends in the vise-like space between the head of the bolt and the post.

The first cost of my device is much greater than staples; but as it is so permanent and lasting it is ultimately much cheaper than staples.

In place of the nut as a means for drawing the bolt so as to clamp the wire, the bolt may be provided with an eye, and a wedge-key driven into the eye will perform the office properly. Such a device could be made cheaper than the screw and nut.

What I claim as new is—

In a wire fence, the combination, with the post to which the wire is attached, of a hook-headed bolt and an independent metallic bearing between the wire and the post, and means, substantially as shown, acting upon said bolt to cause it to gripe the wire between its head and the said bearing-face.

In testimony that I claim the forgoing I have hereunto set my hand this 10th day of May, 1881.

THOMAS S. WOODRUFF.

Witnesses:
JNO. K. HALLOCK,
W. R. EDELEN.